United States Patent [19]
Kohno et al.

[11] Patent Number: 5,698,154
[45] Date of Patent: Dec. 16, 1997

[54] METHOD FOR CHARGING MOLDING MATERIAL IN ELASTIC MOLDING DIE

[75] Inventors: Hiroshige Kohno; Satoru Hamada; Osamu Tsuchiya, all of Arakawa-ku; Akinori Watanabe, Shibuya-ku; Itaru Horiguchi; Atsushi Sato, both of Ryugasaki, all of Japan

[73] Assignees: Asahi Denka Kogyo Kabushikikaisya; Okamoto Industries, Inc., both of Tokyo, Japan

[21] Appl. No.: 620,738

[22] Filed: Mar. 18, 1996

Related U.S. Application Data

[63] Continuation of Ser. No. 308,916, Sep. 20, 1994, abandoned.

[30] Foreign Application Priority Data

Sep. 22, 1993 [JP] Japan ................... 5-236686

[51] Int. Cl.$^6$ ................... B29C 41/10; B29C 41/36
[52] U.S. Cl. ................... 264/313; 264/314; 264/316; 425/DIG. 44
[58] Field of Search ................... 264/313, 314, 264/316, 319, 328.7, 328.8; 425/DIG. 44, 440, 453, 112

[56] References Cited

U.S. PATENT DOCUMENTS

| | | | |
|---|---|---|---|
| 3,906,068 | 9/1975 | Hanusa | 264/313 |
| 4,613,441 | 9/1986 | Kohno et al. | 55/158 |
| 4,800,054 | 1/1989 | Roestenberg | 264/316 |
| 5,080,854 | 1/1992 | Katoh et al. | 425/DIG. 44 |
| 5,154,937 | 10/1992 | Fujishima | 425/440 |
| 5,263,844 | 11/1993 | Akutagawa | 264/314 |
| 5,306,460 | 4/1994 | Hidawa | 264/313 |
| 5,332,190 | 7/1994 | Watanabe et al. | 264/313 |

FOREIGN PATENT DOCUMENTS

| | | |
|---|---|---|
| 0273609 | 7/1988 | European Pat. Off. . |
| 0299113 | 1/1989 | European Pat. Off. . |
| 0395756 | 11/1990 | European Pat. Off. . |

*Primary Examiner*—Angela Y. Ortiz
*Attorney, Agent, or Firm*—Sherman and Shalloway

[57] ABSTRACT

In charging a fluid molding material in an elastic molding die composed of a die body having an opening and a die support portion extending from the opening to the outside by pouring the molding material from the opening into time die body, the molding material in an amount of ⅕ to ⅗ of a volume of the die body is first charged, a molding material-charged portion of the die body is then crumpled or pinched, and then the entire die body is filled up with the molding material. The crumpling or pinching operation is achieved by such means as a blade shutter, pressing plates, air bags, or passing between two plates or conveyor belts, thereby charging the fluid molding material in the die body of the elastic-molding die without occurrence of air voids.

13 Claims, 3 Drawing Sheets

METHOD FOR CHARGING MOLDING MATERIAL IN ELASTIC MOLDING DIE

This application is a continuation of application Ser. No. 08/308,916, filed Sep. 20, 1994, now abandoned.

FIELD OF THE INVENTION

This invention relates to a method for charging a molding material in an elastic molding die when the molding material is molded using the elastic molding die made of an elastic material such as rubber.

DESCRIPTION OF THE PRIOR ART

Heretofore, there has been known a method for molding a fluid molding material using an elastic molding die. In this method, using an elastic molding die comprising a hollow body (molding die) having an opening and a film-formed die support portion, for example, conically extending continuously from the opening to the outside, a fluid molding material is poured into the molding die from the opening to fill in the die, heated or cooled to solidify the molding material, and then the solidified molding is removed from the elastic molding die through the opening utilizing the elasticity of the molding die. This molding method is suitable for molding chocolate, jelly, cheese, boiled fish paste, lipsticks, and the like, compared to a molding method using a rigid split molding die, and the resulting molding has a good appearance and the molding cost is low.

However, this method involves various problems in charging the fluid molding material in the elastic molding die body. For example, when molding chocolate by the method, since molten chocolate has a viscosity of 5,000 to 12,000 cps, it is difficult to charge the material to fine-structured corners of the die body. That is, an air void occurs in a small projection in the die body, which is hard to be filled with chocolate. As a result, surface irregularities or pinholes occur in the molding, resulting in an inferior appearance, and it is difficult to obtain a product of a predetermined design.

To eliminate such defects, a method has been proposed in which the entire elastic molding die is covered with a cup having a hole, the cup is evacuated from the hole to inflate the elastic molding die and, with the elastic molding die in the inflated condition, the molding material is poured from the opening into the elastic molding die (Japanese Paten Laid-open Publication (OPI) 63-312112).

A primary object of the present invention is to provide a method for charging a fluid molding material in the body of an elastic molding die without occurrence of air voids and eliminating the above problems.

SUMMARY OF THE INVENTION

In accordance with the present invention, there is provided a method for charging a molding material in an elastic molding die comprised of a hollow die body having an opening and a film-formed die support portion extending from said opening to the outside, characterized in that, in pouring a fluid molding material from said opening into said die body, ⅕ to ⅗ of a volume of said die body is first charged with the molding material, the portion charged with the molding material is crumpled or pinched, and the entire portion of said die body is then filled up with the molding material.

DETAILED DESCRIPTION OF PREFERRED EMBODIMENTS

Figure 1:
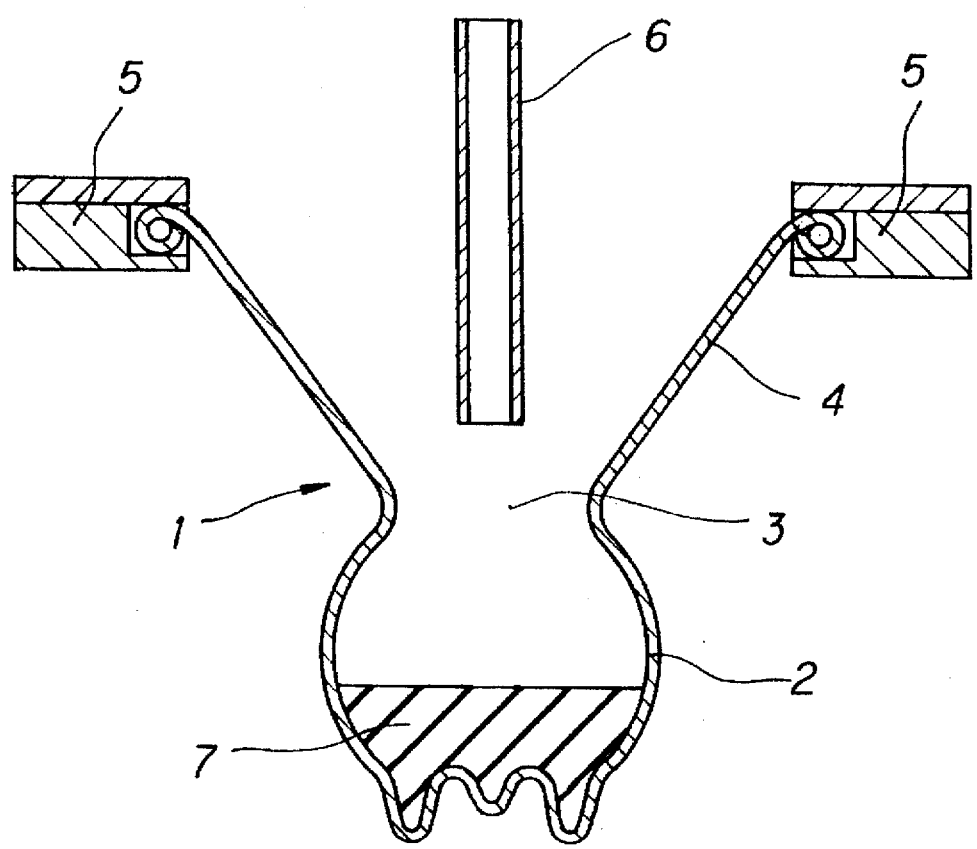
FIG. 1 is a schematic cross sectional view showing a charging condition of the molding material in the elastic molding die according to the present invention.

The present invention will now be described further in detail. In charging the elastic molding die with a fluid molding material, the molding material in an amount of ⅕ to ⅗ to the volume of the die body is poured in the die body. In the pouring operation, an end of the die support portion of the elastic molding die is held on a ring-formed frame with the die body hung down, and the molding material is poured from the opening of the die body. FIG. 1 is a schematic cross sectional view showing the pouring operation. In FIG. 1, the reference numeral 1 indicates an elastic molding die, 2 indicates a die body, 3 indicates an opening of the die body, 4 indicates a film-formed die support portion extending from the opening to the outside, 5 indicates a ring-formed frame for holding an end of the die support portion, 6 indicates an introduction pipe for pouring in the fluid molding material, and 7 indicates the charged molding material.

As described above, in the present invention, with the die body charged with the molding material in an amount of ⅕ to ⅗ of the volume of the die body, the molding material-charged portion of the die body is crumpled or pinched. In general, an elastic molding die often forms a find pattern at a tip of the die body, and a so-called air void tends to occur at the find-patterned tip portion. With the die body charged with the molding material in an amount of ⅕ to ⅗ of the volume of the die body, that is, in a condition that the tip portion of the elastic molding die is filled with the molding material, the molding material-charged portion is subjected to crumpling (rubbing) or pinching to remove the air void occurred at the fine-patterned portion. Further, by the crumpling or pinching operation, the charged fluid molding material, the charged fluid molding material spreads on the entire inner wall surface of the die body, that is, on the inner wall surface of unfilled portion of the die body, to wet the surface, and remove air between the die body and the molding material, and the remaining portion of the molding material, which is further poured in, can be smoothly charged. Thus, the molding material is charged in all parts of the die body, without making air voids even in a fine-patterned small projection of the die body. Therefore, the outer surface of the molding has no irregularities due to such air voids, and a product of good appearance of a predetermined design with no pinholes can be obtained. With the method of the present invention, the molding material can be charged into all parts of the die body without using means such as previously swelling the elastic molding die before filling.

The crumpling or pinching operation of the present invention is achieved using various methods. This will be described with reference to the Examples.

Figure 2A:
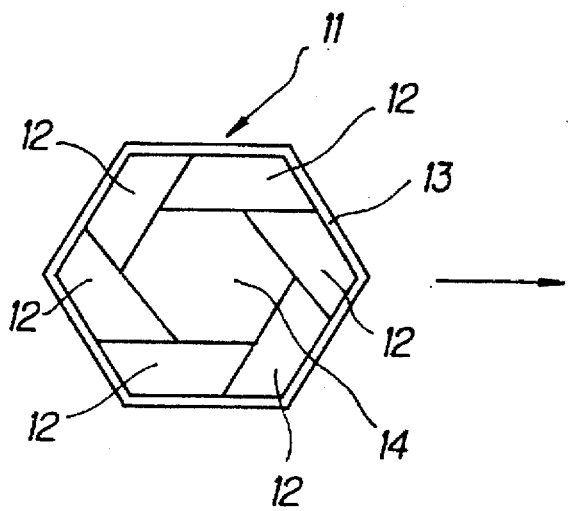
FIGS 2(a) and 2(b) are schematic up views of a blade shutter used in the present invention.
Figure 2B:
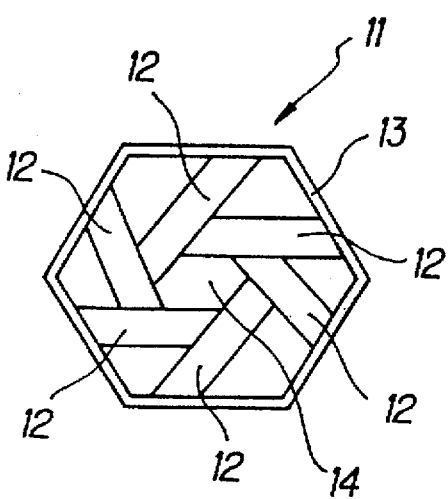

In an Example, a shutter comprising blades like an iris diaphragm of a camera is used. FIG. 2 is a schematic up view of an example of a shutter, (a) shows an open condition of the shutter, and (b) shows a closed condition of the shutter. A shutter 11 comprises a plurality of blades 12, and the individual blades 12 are contained in a frame 13. The blades 12 are moved along the frame 13 to open and close the shutter, widening and narrowing a center hold 14. The molding material charging portion of the die body is inserted in the center hole 14 of the shutter 11, and the shutter is repeatedly opened and closed to achieve crumpling or pinching operation of the die body. The molding material-charged portion of the die body is repeatedly compressed and released to move the molding material in the die body, spread to the entire inner wall surface to wet the wall surface, and air between the die body and the molding material is removed. A single shutter may be used or two or more shutters may be used at appropriate vertical intervals.

Figure 3:
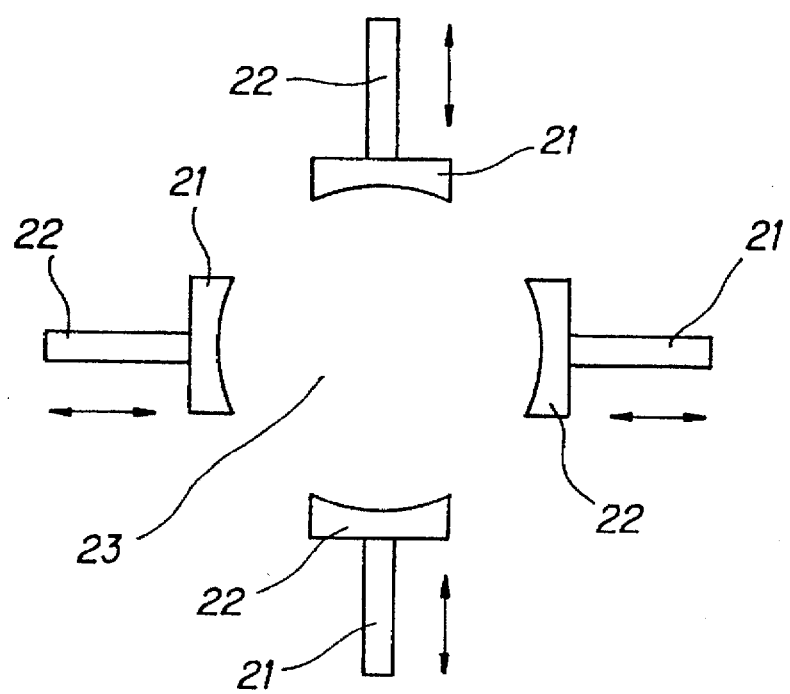
FIG. 3 is a schematic up view of a pressing plate used in the present invention.

Another example of crumpling or pinching operation uses a pressing plate as shown in FIG. 3. In FIG. 3, the reference numeral 21 indicates a pressing plate, and 22 indicates a rod connecting to the plate. FIG. 3 is a schematic up view of an example, which uses four pressing plates, arranged to form a hole 23 at the center. The pressing plates 21 can be moved right and left. The molding material-charged portion of the die body is inserted in the hole 23, and the pressing plates 21 are moved to the right and left. By repeating this procedure, the molding material-charged portion of the die body is repeatedly pressed and released, the molding material in the die body is moved to be spread on the entire inner wall surface of the die body to wet the inner wall, and air between the die body and the molding material is removed. In this case, the number of pressing plates may be two or more. The individual pressing plates preferably have a thickness. Alternatively, the molding material-charged portion may be pressed against a fixed surface, and the pressing plates 21 are attached which are moved. Further, instead of moving the pressing plates, an air bag may be used which is repeatedly swollen. Specifically, a plurality of air bags are disposed, for example, along an inner surface of a cylinder, with the air bags in a deflated condition, the molding material-charged portion is placed at the center of the cylinder, and air is then introduced to the air bags to inflate them. The molding material-charged portion is crumpled or pinched or pressed by the swollen air bags. By repeatedly inflating the air bags, the molding material-charged portion of the die body is repeatedly pressed and released.

In an embodiment of the present invention a molding material is charged to an elastic die comprising a hollow die body having an opening and a film-formed die support portion extending from said opening to the outside. The molding material is charged to the hollow die by pouring a fluid molding material from the opening into said die body and charging $1/5$ to $3/5$ of a volume of said die body with the molding material. The portion of the die body charged with the molding material is passed between two opposing surfaces which comprise an entrance and an exit and an intermediate portion, wherein the entrance and exit are wider than the portion of the die body charged with the molding material and the intermediate portion is narrower than the portion of the die body charged with the molding material such that the portion of the die body charged with molding material on passing between the two opposing surfaces is crumpled and released, and then the remaining portion of the die body is filled up with the molding material.

Figure 4A:
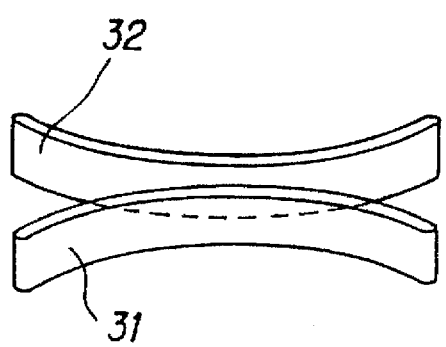
FIGS. 4(a) and 4(b) are schematic perspective views showing a condition using two plates in the present invention.
Figure 4B:
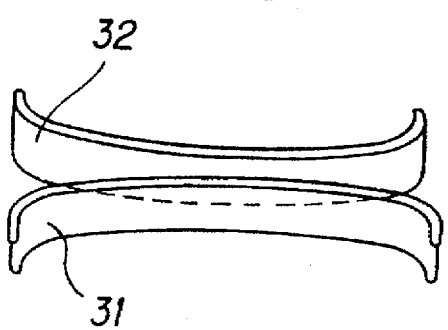
Figure 5:
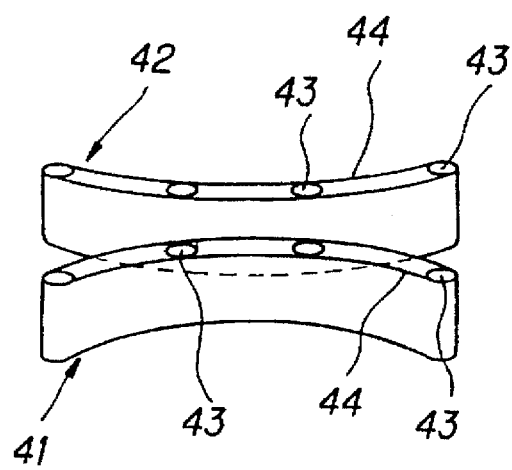
FIG. 5 is a schematic perspective view showing a condition using two sets of conveyor belts in the present invention.
Figure 6:
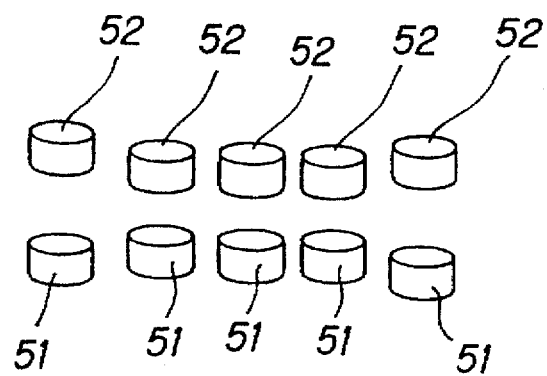
FIG. 6 is a schematic perspective view showing a condition using two rows of roller arrays in the present invention.

A further example of crumpling or pinching operation uses two plates 31 and 32 shown in perspective views FIGS. 4(a) and (b). That is, the molding material-charged portion of the die body is passed between the two plates 31 and 32 which are disposed at a spacing narrower than the charged portion. The two plates may be disposed to be the narrowest at the center as shown in FIG. 4(a), or may be disposed so that the entrance and the exit are wide as shown In FIG. 4(b) and other portions are parallel to each other to be narrower than the molding material-charged portion. By passing the molding material-charged portion of the die body between the two plates 31 and 32 disposed with a spacing narrower than the charged portion, the molding material in the die body is moved to be spread on the entire inner wall surface of the die body to wet the inner wall, and air between the die body and the molding material is removed. Further, instead of the two plates, two sets of conveyor bells may be used. FIG. 5 is a schematic perspective view showing such an arrangement, in which the molding material-charged portion is passed between two conveyor belts 41 and 42. In the Figure, the reference numeral 43 indicates a roll, and 44 indicates a belt. Further, as shown in FIG. 6, the molding material-charged portion of the die body can alternatively be passed between rolls 51 and 52 disposed in two rows with a spacing narrower than the charged portion. The individual rolls are rotatably mounted.

With the present invention, in molding a fluid molding material by an elastic molding die, even a molding material having a high viscosity such as molten chocolate can be charged to all parts of the die body without occurrence of an air void in a small projection of the die body. Therefore, a molding of a predetermined design of good appearance with no surface irregularities due to air voids occurred in charging can be obtained. With the present invention, the molding material can be charged to all parts of the die body without using means for previously inflating the elastic molding die.

What is claimed is:

1. A method for charging a molding material in an elastic molding die comprising a hollow die body having an opening and a film-formed die support portion extending from said opening to the outside, which method consists essentially of pouring a fluid molding material from said opening into said die body and charging $1/5$ to $3/5$ of a volume of said die body with the molding material, the portion of the die body charged with the molding material is passed between two opposing surfaces which comprise an entrance and an exit and an intermediate portion, wherein the entrance and exit are wider than the portion of the die body charged with the molding material and the intermediate portion is narrower than the portion of the die body charged with the molding material such that the portion of the die body charged with molding material on passing between the two opposing surfaces is crumpled and released, and then the remaining portion of said die body is filled up with the molding material.

2. The method of claim 1, wherein the crumpling operation is carried out by passing the molding material charged portion of said die body between two opposing surfaces which comprise two plates disposed with a spacing narrower than the charged portion.

3. The method of claim 1, wherein the crumpling operation is carried out by passing the molding material charged portion of said die body between two opposing surfaces which comprise two conveyor belts disposed with a spacing narrower than the charged portion.

4. The method of claim 1, wherein the crumpling operation is carried out by passing the molding material charged portion of said die body between two opposing surfaces which comprise two rows of rolls disposed with a spacing narrower than the charged portion.

5. A method for charging a molding material in an elastic molding die comprising a hollow die body having an opening and a film-formed die support portion extending from said opening to the outside, which method consists essentially of pouring a fluid molding material from said opening into said die body and charging $1/5$ to $3/5$ of a volume of said die body with the molding material, the portion of the die body charged with the molding material is passed between two opposing surfaces which comprise an entrance and an exit and an intermediate portion, wherein the entrance and exit are wider than the portion of the die body charged with the molding material and the intermediate portion is narrower than the portion of the die body charged with the molding material such that the portion of the die body charged with molding material on passing between the two opposing surfaces is crumpled and released to move and spread the molding material in the die body on the entire inner wall surface of the die body to wet the inner wall surface and to remove the air between the die body and the molding material, and then the entire portion of said die body is filled with the molding material.

6. The method of claim 5, wherein the crumpling operation is carried out by passing a molding material charged portion of said die body between two opposing surfaces which comprise two plates disposed with a spacing narrower than the charged portion.

7. The method of claim 5, wherein the crumpling operation is carried out by passing a molding material charged portion of said die body between two opposing surfaces which comprise two conveyor belts disposed with a spacing narrower than the charged portion.

8. The method of claim 5, wherein the crumpling operation is carried out by passing a molding material charged portion of said die body between two opposing surfaces which comprise two rows of rolls disposed with a spacing narrower than the charged portion.

9. A method for charging a molding material in an elastic molding die comprising a hollow die body having a fine-patterned portion and having opening and a film-formed die support portion extending from said opening to the outside, which method consists essentially of pouring a fluid molding material from said opening into said die body and charging $1/5$ to $3/5$ of a volume of said die body with the molding material, the portion of the die body charged with the molding material is passed between two opposing surfaces which comprise an entrance and an exit and an intermediate portion, wherein the entrance and exit are wider than the portion of the die body charged with the molding material and the intermediate portion is narrower than the portion of the die body charged with the molding material such that the portion of the die body charged with molding material on passing between the two opposing surfaces is crumpled and released to move the molding material into the fine-pattern of the fine patterned portion of the die body and to remove air between the fine patterned portion of the die body and the molding material, and then the entire portion of the said die body is filled up with the molding material.

10. The method of claim 9, wherein the crumpling and releasing of the portion of the die body charged with the molding material moves and spreads the molding material in the die body on the entire inner wall surface of the die body to wet the inner wall surface and to remove the air between the die body and the molding material.

11. The method of claim 9, wherein the crumpling operation is carried out by passing the molding material charged portion of said die body between two opposing surfaces which comprise two plates disposed with a spacing narrower than the charged portion.

12. The method of claim 9, wherein the crumpling operation is carried out by passing the molding material charged portion of said die body between two opposing surfaces which comprise two conveyor belts disposed with a spacing narrower than the charged portion.

13. A method of claim 9, wherein the crumpling operation is carried out by passing the molding material charged portion of said die body between two opposing surfaces which comprise two rows of rolls disposed with a spacing narrower than the charged portion.

* * * * *